(12) United States Patent
Wang

(10) Patent No.: US 11,903,475 B2
(45) Date of Patent: Feb. 20, 2024

(54) VISUAL TWEEZERS AND TWEEZERS ASSEMBLY

(71) Applicant: HEIFENG ZHIZAO (SHENZHEN) TECHNOLOGY CO., LTD, Shenzhen (CN)

(72) Inventor: Shihong Wang, Shenzhen (CN)

(73) Assignee: HEIFENG ZHIZAO (SHENZHEN) TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 18/340,983

(22) Filed: Jun. 26, 2023

(65) Prior Publication Data

US 2023/0329418 A1    Oct. 19, 2023

Related U.S. Application Data

(63) Continuation of application No. PCT/CN2021/130131, filed on Nov. 11, 2021.

(30) Foreign Application Priority Data

Nov. 12, 2020   (CN) .......................... 202011262911.3

(51) Int. Cl.
  *G06T 1/00*   (2006.01)
  *A45D 26/00*  (2006.01)
(52) U.S. Cl.
  CPC ........ *A45D 26/0076* (2013.01); *G06T 1/0007* (2013.01); *G06T 1/0014* (2013.01)
(58) Field of Classification Search
  CPC ..... A61B 17/28; A61B 17/2804; A61B 17/29; A61B 2017/2901; A61B 2017/2902;

(Continued)

(56) References Cited

U.S. PATENT DOCUMENTS 9,055,961 B2 *  6/2015  Manzo ............... A61B 18/1445
2016/0270808 A1  9/2016  Taylor et al.

FOREIGN PATENT DOCUMENTS

CN    205724963 U    11/2016
CN    108015796 A     5/2018
(Continued)

OTHER PUBLICATIONS

International Search Report issued in corresponding International application No. PCT/CN2021/130131, dated Feb. 10, 2022.

(Continued)

*Primary Examiner* — Todd J Scherbel
(74) *Attorney, Agent, or Firm* — Daniel M. Cohn; Howard M. Cohn

(57) ABSTRACT

The present disclosure provides visual tweezers, includes a first shell, a first clamping arm rotatably connected to an end portion of the first shell, a second clamping arm rotatably connected to an end portion of the first shell and forming a clamping structure with the first clamping arm, and a push block slidably connected to the first clamping arm and the second clamping arm and configured to control opening and closing angles of the first clamping arm and the second clamping arm during sliding, wherein a first sliding slot is formed in the first clamping arm; a second sliding slot is formed in the second clamping arm; an angle between an extending direction of the first sliding slot and an extending direction of the second sliding slot is an acute angle.

8 Claims, 6 Drawing Sheets

(58) Field of Classification Search
CPC .... A61B 2017/2903; A61B 2017/2926; A61B 2017/2932; A61B 2017/2933; A61B 2017/2936; A61B 18/1442; A61B 18/1445; A61B 18/1447; A61B 2018/1462; A61B 34/30; A45D 26/0076; G06T 1/0007
See application file for complete search history.

(56) References Cited

FOREIGN PATENT DOCUMENTS

| | | |
|---|---|---|
| CN | 110822169 A | 2/2020 |
| CN | 211534731 U | 9/2020 |
| CN | 112353560 A | 2/2021 |
| CN | 214318293 U | 10/2021 |

OTHER PUBLICATIONS

Written Opinion of the International Searching Authority for No. PCT/CN2021/130131.

\* cited by examiner

VISUAL TWEEZERS AND TWEEZERS ASSEMBLY

CROSS-REFERENCE TO RELATED APPLICATIONS

This application is a continuation of International Application No. PCT/CN2021/130131, filed on Nov. 11, 2021, which claims priority to Chinese Patent Application No. CN202011262911.3, filed on Nov. 12, 2020, the entire contents of which are incorporated herein by reference.

TECHNICAL FIELD

The present disclosure belongs to the technical field of personal hygiene, and more particular, to visual tweezers and a tweezers assembly.

BACKGROUND

Nowadays, to use tweezers on the market, the tweezers are usually manually controlled to be opened and closed to clamp and hold a target object, which heavily depends on the experience of an operator and the operability of the tweezers. Especially in dark and narrow spaces, for example, the ear canal, throat, or another part of a person, it is inconvenient to operate the tweezers, and actions are not precise enough. Furthermore, the ear canal, throat, and another part of the person are dark, so that even with the help of external light, an operator cannot perform precise operations in these dark and narrow parts with the existing tweezers, and a usage requirement of the operator cannot be met.

SUMMARY

To solve the above-mentioned problems, in the first aspect, the present disclosure provides visual tweezers, including:

a first shell, a first clamping arm rotatably connected to an end portion of the first shell, a second clamping arm rotatably connected to an end portion of the first shell and forming a clamping structure with the first clamping arm, and a push block slidably connected to the first clamping arm and the second clamping arm and configured to control opening and closing angles of the first clamping arm and the second clamping arm during sliding, wherein a first sliding slot is formed in the first clamping arm;

a second sliding slot is formed in the second clamping arm;

an angle between an extending direction of the first sliding slot and an extending direction of the second sliding slot is an acute angle; and a first sliding member in sliding fit with the first sliding slot, and a second sliding member in sliding fit with the second sliding slot are arranged on the push block.

Further, one end of the first shell away from the first clamping arm is detachably connected with a mounting support;

a drive component is mounted at one end of the mounting support close to the first shell;

the drive component includes a drive motor, a rotating shaft, a shaft sleeve, and a sliding rod;

a drive shaft of the drive motor is in key connection with the rotating shaft;

a screw rod is arranged at one end of the rotating shaft away from the drive shaft, and the screw rod and the drive shaft are coaxially arranged; and the shaft sleeve is screwed with the rotating shaft through the screw rod.

Further, a limiting slot used for limiting rotation of the shaft sleeve is formed in the end of the mounting support close to the first shell;

one end of the shaft sleeve is located in the limiting slot, and the shaft sleeve is in sliding connection with the mounting support through the limiting slot;

the sliding rod is connected to the shaft sleeve; and one end of the sliding rod away from the shaft sleeve is fixedly connected with the push block.

Further, the first shell includes a camera sleeve and a fixed sleeve configured to be detachably connected to the mounting support and integrated with the camera sleeve;

an inner diameter of the camera sleeve is less than an inner diameter of the fixed sleeve;

a sliding hole penetrating through the camera sleeve and allowing the sliding rod to slide is formed in an extending direction of the camera sleeve; and the sliding hole is communicated with an inner cavity of the fixed sleeve.

Further, a camera component is mounted in a close-fitting manner at one end of the camera sleeve away from the fixed sleeve;

the first clamping arm is rotatably connected to the end of the camera sleeve away from the fixed sleeve;

the second clamping arm is rotatably connected to the end of the camera sleeve away from the fixed sleeve, and forms the clamping structure with the first clamping arm;

the clamping structure is located in a capturing region of the camera component;

an end portion of the camera component away from a capturing end of the camera component is electrically connected with a communication line; and an extending direction of a section of the communication line located in the fixed sleeve is parallel to an extending direction of the sliding rod.

Further, an accommodating slot is formed in one end of the mounting support away from the drive component;

a battery module located in the accommodating slot, a main board module electrically connected to the battery module, an image processing module electrically connected to the main board module, and a charging module electrically connected to the main board module are mounted on the mounting support;

an end portion of the main board module is fixedly connected to the mounting support;

one end of the communication line away from the camera component is connected to the main board module;

the charging module is mounted at the end of the mounting support away from the drive component;

the charging module includes an iron ring, a first copper negative member, and a first positive thimble;

the iron ring is mounted at the end of the mounting support away from the drive component; the first copper negative member sleeves the iron ring and is electrically connected to the main board module; and the first positive thimble is electrically connected to the main board module by passing through the first copper negative member, the iron ring, and an end portion of the mounting support in sequence.

Further, the first shell is sleeved with a cover body; a magnetic part is attached on the cover body;

one end of the communication line located in the fixed sleeve is electrically connected to a hall magnetic switch used for sensing the magnetic part;

when the cover body is covered at the first shell, the hall magnetic switch senses the magnetic part, and the main board module cuts off a power supplying circuit of the battery module; and when the cover body is separated from the first shell, magnetic sensing between the hall magnetic switch and the magnetic part is cut off, and the main board module initiates the power supplying circuit of the battery module.

Further, the visual tweezers further includes a rubber sleeve sleeving the clamping structure, wherein the rubber sleeve is provided with an inwards sunken groove.

Further, the visual tweezers further includes a base component, wherein the base component includes a first base member, a first ring covered at the first base member, and a power supplying module mounted on the first base member;

the power supplying module includes an annular magnet mounted on the first base member, a second copper negative member sleeving the annular magnet, a second positive thimble arranged on the first base member in a penetrating manner, and a power supplying board mounted on the first base member;

when the charging module is plugged into the base component, the annular magnet attracts the iron ring for fixing; the first positive thimble resists against the second positive thimble; and the first copper negative member resists against the second copper negative member.

The beneficial effects of the visual tweezers: compared with the prior art, the visual tweezers provided in the present disclosure have the advantages that due to the clamping structure formed by the first clamping arm and the second clamping arm which are rotatably connected to the first shell, and the slidable connection between the push block and the first sliding slot as well as the second sliding slot, the push block is pushed out and pulled back to control the first clamping arm and the second clamping arm to be opened and closed. The angle between the extending direction of the first sliding slot and the extending direction of the second sliding slot is set to be the acute angle because the first sliding slot and the second sliding slot which are parallel to each other hardly complete opening and closing actions under the pushing of the push block. In addition, compared with an obtuse angle, the acute angle has the advantages that it is easier to control a size of the opening angle between the first clamping arm and the second clamping arm, and the visual tweezers with the acute angle setting are better operated in a narrow space, such as the ear canal, nasal cavity, or throat of a person, than visual tweezers with the obtuse angle setting.

To solve the above-mentioned problems, in the second aspect, the present disclosure also provides a tweezers assembly, including the visual tweezers as described in the first aspect and including an intelligent terminal device in communication connection with the main board module, wherein the main board module is provided with the image processing module configured to form an image signal according to an image captured by the camera component and send the image signal to the intelligent terminal device; the intelligent terminal device is provided with an adjustment module; the adjustment module is configured to send, according to the image signal received by the intelligent terminal device, an adjustment instruction for adjusting opening and closing angles between the first clamping arm and the second clamping arm to the main board module; and the main board module controls a rotating direction and rotating speed of the drive motor according to the adjustment instruction to control opening and closing angles of the visual tweezers.

The beneficial effects of the tweezers assembly: compared with the prior art, the tweezers assembly provided in the present disclosure has the advantages below: As the intelligent terminal device in communication connection with the main board module is arranged, and the image processing module is arranged on the main board module, the image processing module can send the image captured by the camera component to the intelligent terminal device. Furthermore, the intelligent terminal device is provided with the adjustment module. The adjustment module can send, according to the received image signal, the adjustment instruction for adjusting the opening and closing angles between the first clamping arm and the second clamping arm to the main board module, so that the intelligent terminal device can control the opening and closing angles of the visual tweezers in real time and conveniently, and the visual tweezers can still be precisely intelligently controlled and operated even in dark and narrow places, thereby fully meeting needs of an operator.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

Figure 1:
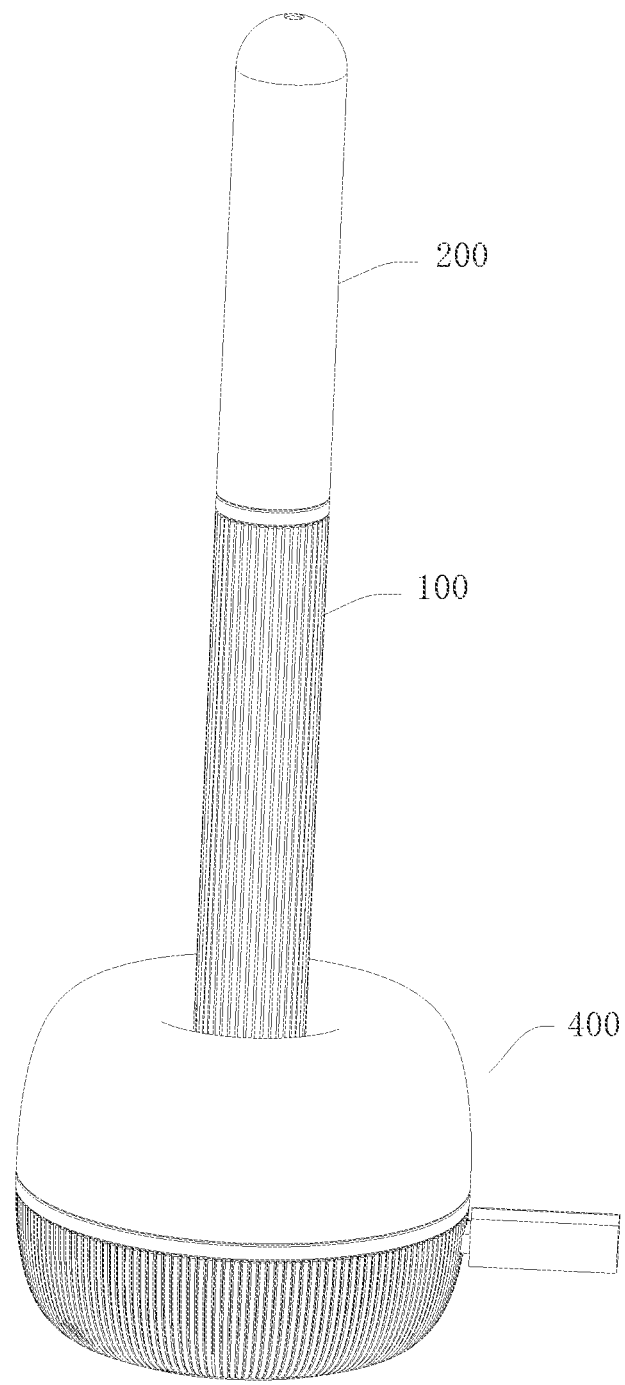
FIG. 1 is a schematic diagram of a combined structure of visual tweezers and a tweezers assembly according to an embodiment of the present disclosure.

Main reference numerals in the drawings:

1: first shell; 11: integrated camera sleeve; 111: sliding hole; 112: fixed lug; 113: limiting ring; 12: fixed sleeve;

2: first clamping arm; 21: first sliding slot;

3: second clamping arm; 31: second sliding slot;

4: push block; 41: first sliding member; 42: second sliding member;

5: mounting support; 51: limiting slot; 52: accommodating slot; 53: battery module; 54: image processing module; 55: charging module; 551: iron ring; 552: first copper negative member; 553: first positive thimble; 56: first round countersink; 57: first cylinder; 58: first annular slot; 59: main board module;

6: drive component; 61: drive motor; 611: silica gel sleeve; 62: rotating shaft; 621: screw rod; 63: shaft sleeve; 631: mounting hole; 632: adjustment rod; 64: sliding rod;

7: camera component; 71: external member; 72: camera; 73: supplement light group; 74: wide-angle lens;

8: communication line; 81: reinforcing layer; 82: hall magnetic switch;

9: cover body; 91: magnetic part;

100: second shell; 200: third shell;

300: rubber sleeve; 301: inwards sunken groove;

400: base component; 401: first base member; 402: first ring; 4021: fixed posts; 403: power supplying module; 4031: annular magnet; 4032: second copper negative member; 4033: power supplying board; 4034: second positive thimble;

500: second round countersink; 501: second cylinder; 502: second annular slot;

600: balancing weight; 700: antiskid member; 800: second base member;

900: second ring; 901: mounting barrel;

1000: mounting barrel; 1001: adjustment module.

DETAILED DESCRIPTION OF THE EMBODIMENTS

In order to make technical problem, technical solution and beneficial effects of the present disclosure will be clearly, the present disclosure is further described below in combination with accompanying drawings and implementations. It should be understood that the specific embodiments described herein are intended only to explain the present disclosure and are not intended to define the present disclosure.

It should be noted that when a component is said to be "fixed" or "set" on another component, it may be directly on another component or indirectly on that other component. When a component is said to be "connected" to another component, it may be directly connected to another component or indirectly connected to that other component.

It is to be understood that, The terms "width", "Length", "upper", "lower", "front", "rear", "left", "right", "vertical", "horizontal", "top", "bottom", "inner", "outer", and the like indicate azimuth or positional relationships based on the azimuth or positional relationships shown in the drawings, For purposes of convenience only of describing the present disclosure and simplifying the description, Rather than indicating or implying that the indicated device or element must have a particular orientation, be constructed and operated in a particular orientation, therefore, not to be construed as limiting the present disclosure.

In addition, The terms "first" and "second" are used for descriptive purposes only, While not to be construed as indicating or implying relative importance or implicitly specifying the number of technical features indicated thereby, features defining "first," "second," and "second" may explicitly or implicitly include one or more of the described features. In the description of the present disclosure, "multiple" means two or more unless explicitly specified otherwise.

Referring to FIG. 1 to FIG. 9 together, visual tweezers provided in the present disclosure is now described. The visual tweezers include a first shell 1, a first clamping arm 2 rotatably connected to an end portion of the first shell 1, a second clamping arm 3 rotatably connected to an end portion of the first shell 1 and forming a clamping structure with the first clamping arm 2, and a push block 4 slidably connected to the first clamping arm 2 and the second clamping arm 3 and configured to control opening and closing angles of the first clamping arm 2 and the second clamping arm 3 during sliding.

The first clamping arm 2 and the second clamping arm 3 are achieved by means of pushing of the push block, and the opening angles between the first clamping arm 2 and the second clamping arm 3 and a close of the first clamping arm 2 and the second clamping arm 3 are controlled. It can be set that when the push block is pushed out, the first clamping arm 2 and the second clamping arm 3 are opened, and in the opened state, an opening angle between the first clamping arm 2 and the second clamping arm 3 can be adjusted; and when the push block 4 is pulled back, the first clamping arm 2 and the second clamping arm 3 are closed, so that when the first clamping arm 2 and the second clamping arm 3 are closed, a clamped object is clamped.

A first sliding slot 21 is formed in the first clamping arm 2, and a second sliding slot 31 is formed in the second clamping arm 3. An angle between an extending direction of the first sliding slot 21 and an extending direction of the second sliding slot 31 is an acute angle. A first sliding member 41 in sliding fit with the first sliding slot 21, and a second sliding member 42 in sliding fit with the second sliding slot 31 are arranged on the push block 4.

Compared with the prior art, the visual tweezers provided in the present disclosure have the advantages that due to the clamping structure formed by the first clamping arm 2 and the second clamping arm 3 which are rotatably connected to the first shell 1, and the slidable connection between the push block 4 and the first sliding slot 21 as well as the second sliding slot 31, the push block 4 is pushed out and pulled back to control the first clamping arm 2 and the second clamping arm 3 to be opened and closed. The angle between the extending direction of the first sliding slot 21 and the extending direction of the second sliding slot 31 is set to be the acute angle because the first sliding slot 21 and the second sliding slot 31 which are parallel to each other hardly complete opening and closing actions under the pushing of the push block 4. In addition, compared with an obtuse angle, the acute angle has the advantages that it is easier to control a size of the opening angle between the first clamping arm 2 and the second clamping arm 3, and the visual tweezers with the acute angle setting are better operated in a narrow space, such as the ear canal, nasal cavity, or throat of a person, than visual tweezers with the obtuse angle setting.

Specifically, the first sliding slot 21 and the second sliding slot 31 are waist-shaped holes. The first sliding slot 21 and the second sliding slot 31 form an "inwards splay" shape or an "outwards splay" shape. The push block 4 is a T-shaped block. A first sliding member 41 is arranged at one of two symmetric ends of the T-shaped block, and a second sliding member 42 is arranged at the other end. The first sliding member 41 is slidably connected to the first sliding slot 21, and the second sliding member 42 is slidably connected to the second sliding slot 31.

If the first sliding slot 21 and the second sliding slot 31 form the "inwards splay" shape, the first clamping arm 2 and the second clamping arm 3 are opened when the push block 4 is pushed out, and the first clamping arm 2 and the second clamping arm 3 are closed when the push block 4 is pulled back.

If the first sliding slot 21 and the second sliding slot 31 form the "outwards splay" shape, the first clamping arm 2 and the second clamping arm 3 are closed when the push block 4 is pushed out, and the first clamping arm 2 and the second clamping arm 3 are opened when the push block 4 is pulled back.

The first clamping arm 2 and the second clamping arm 3 are located on the same plane.

A silica gel layer is attached to a clamping tip of the first clamping arm 2 and the second clamping arm 3. On the one hand, the clamping effect during clamping of the first clamping arm and the second clamping arm is improved; and on the other hand, the silica gel layer can reduce damage to the first clamping arm 2 and the second clamping arm 3 by external factors.

Figure 2:
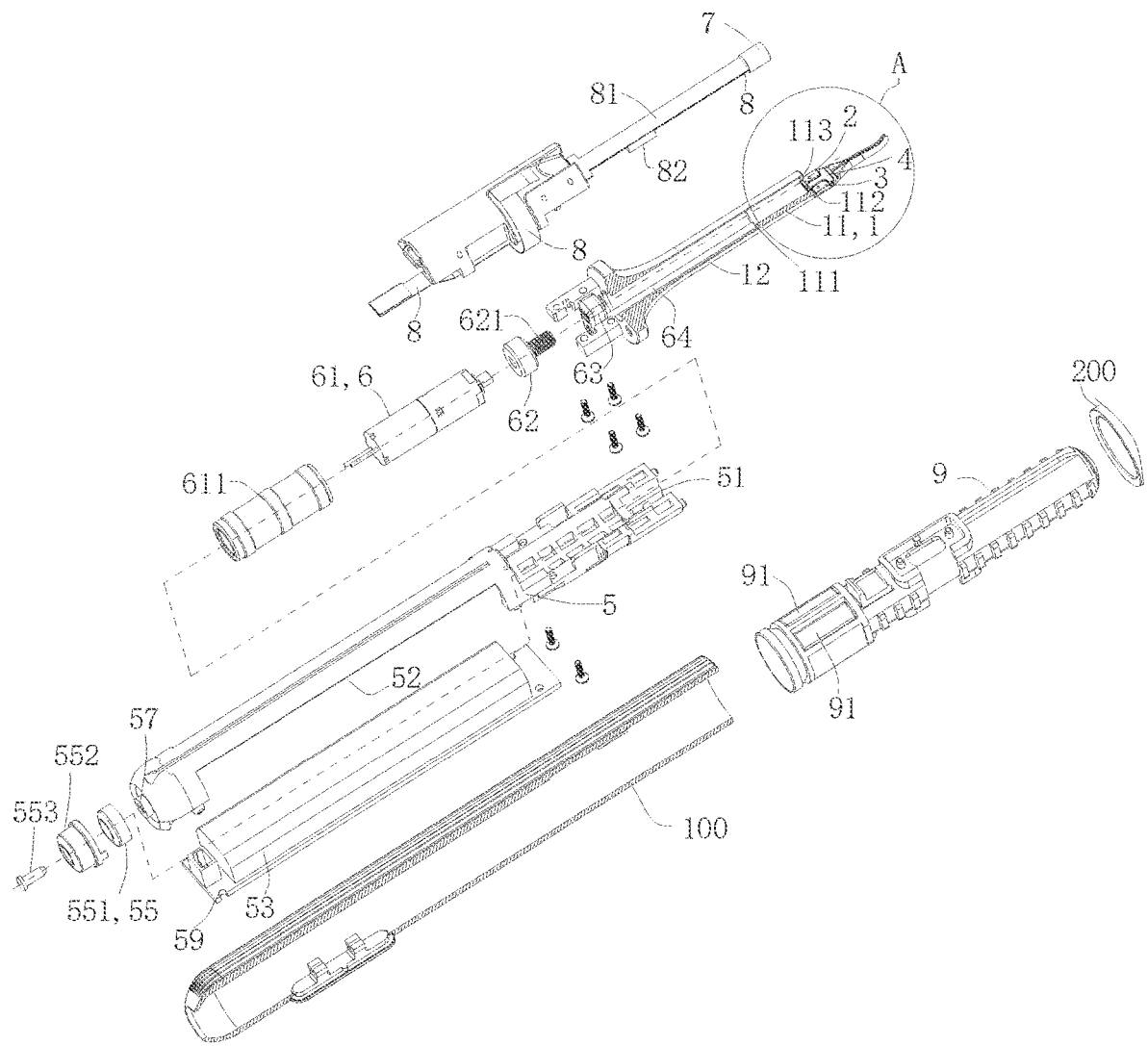
FIG. 2 is a schematic diagram of an exploded structure of visual tweezers according to an embodiment of the present disclosure.
Figure 3:
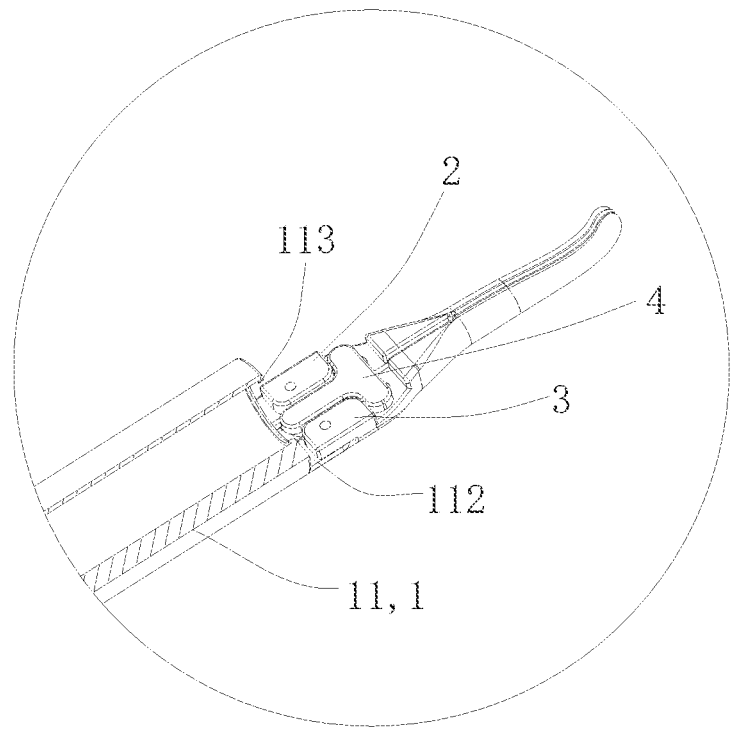
FIG. 3 is a schematic enlarged diagram of the part A in FIG. 2.
Figure 4:
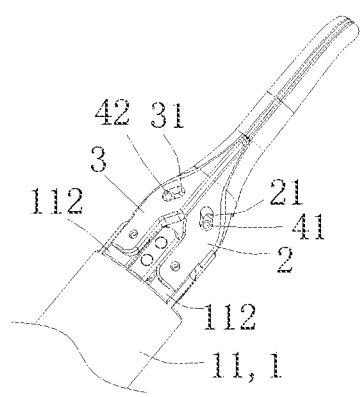
FIG. 4 is a schematic structural diagram of a clamping structure and a push block in visual tweezers according to an embodiment of the present disclosure.
Figure 5:
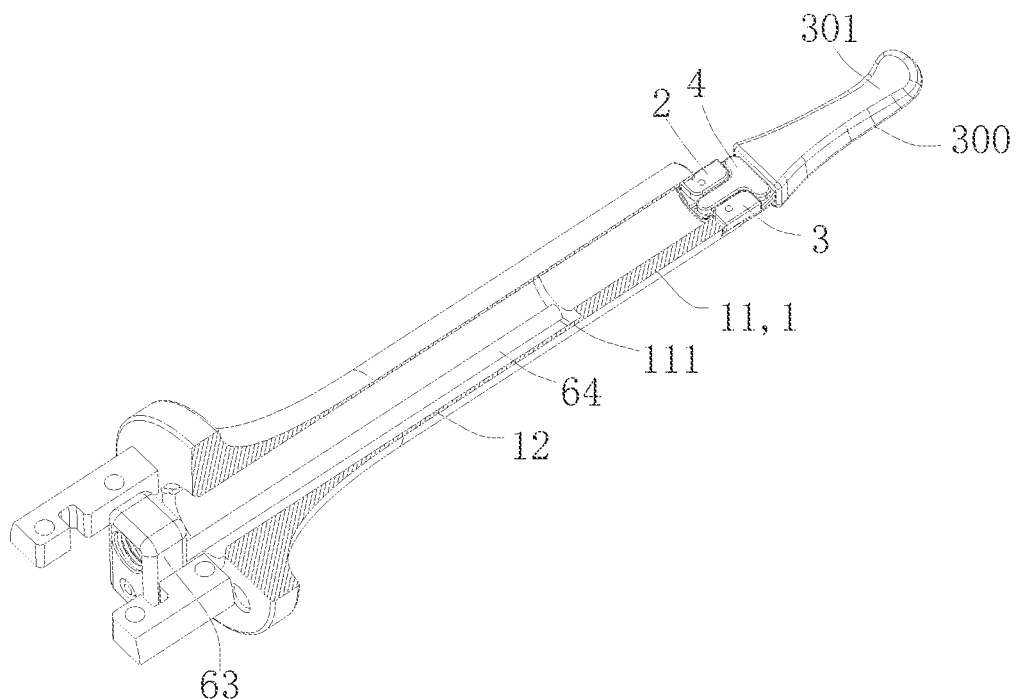
FIG. 5 is a schematic structural diagram of a clamping structure sleeved with a rubber sleeve in visual tweezers according to an embodiment of the present disclosure.
Figure 6:
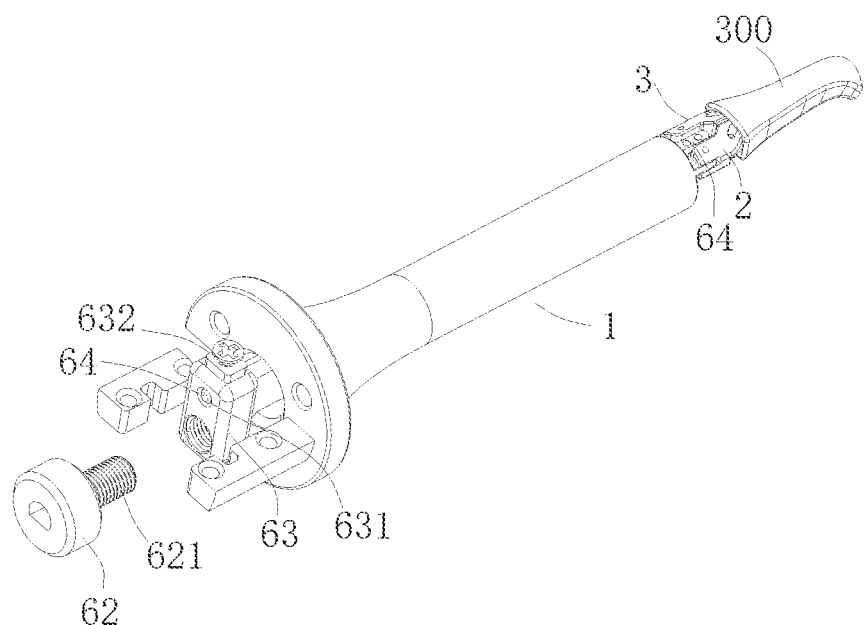
FIG. 6 is a partially structural diagram of a drive component in visual tweezers according to an embodiment of the present disclosure.

Further, referring to FIG. 2, FIG. 5, and FIG. 6, as a specific implementation of the visual tweezers provided in the present disclosure, one end of the first shell 1 away from the first clamping arm 2 is detachably connected with a mounting support 5.

A drive component 6 is mounted at one end of the mounting support 5 close to the first shell 1.

The drive component 6 includes a drive motor 61, a rotating shaft 62, a shaft sleeve 63, and a sliding rod 64.

A drive shaft of the drive motor 61 is in key connection with the rotating shaft 62.

A screw rod 621 is arranged at one end of the rotating shaft 62 away from the drive shaft.

An axial line of the screw rod 621 and an axial line of the drive shaft are located on the same axial line.

The shaft sleeve 63 is screwed with the rotating shaft 62 through the screw rod 621.

A limiting slot 51 used for limiting rotation of the shaft sleeve 63 is formed in the end of the mounting support 5 close to the first shell 1.

One end of the shaft sleeve 63 is located in the limiting slot 51, and the shaft sleeve 63 is slidably connected to the mounting support 5 through the limiting slot 51.

The sliding rod 64 is connected to the shaft sleeve 63, and one end of the sliding rod 64 away from the shaft sleeve 63 is fixedly connected to the push block 4.

The detachable connection between the mounting support 5 and the first shell 1 facilitates removal and mounting of the drive component 6. The drive component 6 is mounted on the mounting support 5 and is close to the first shell 1, so as to facilitate connecting the sliding rod 64 connected with the push block 4 to the drive component 6, which also reduces a phenomenon that the drive effect is affected due to the extremely long sliding rod 64 caused by a long distance between the drive component 6 and the first shell 1. The drive motor 61 rotates to drive the rotating shaft 62, and the rotating shaft 62 drives, through the screw rod 621, the shaft sleeve 63 with one end located in the limiting slot 51, so that the shaft sleeve 63 can achieve pushing and pulling actions relative to the mounting support 5, and the sliding rod 64 connected to the shaft sleeve 63 can realize pushing and resetting functions. Therefore, when the drive motor 61 rotates, the sliding rod 64 pushes the push block 4, and the push block 4 pushes the first clamping arm 2 and the second clamping arm 3 to be opened and closed.

Specifically, the drive motor 61 is sleeved with a silica gel sleeve 611, so that the drive motor 61 can be better mounted on the mounting support 5, and a vibration attenuation effect can be achieved on the drive motor 61. The vibration attenuation effect acts on vibrations generated by the drive motor 61 and vibrations generated on the drive motor 61 by external factors (falling, dropping, treading, and the like).

Specifically, a mounting hole 631 for plugging the sliding rod is formed in the shaft sleeve 63. An adjustment rod 632 is screwed on the shaft sleeve 63. One end of the adjustment rod 632 passes through the shaft sleeve 63 and resists against the sliding rod 64 located in the mounting hole 631, so that after the position of the sliding rod 64 is well adjusted, the position of the sliding rod 64 is fixed through the adjustment rod 632.

Further, referring to FIG. 2, FIG. 5, and FIG. 6 together, as a specific implementation of the visual tweezers provided in the present disclosure, the first shell 1 includes an integrated camera sleeve 11 and a fixed sleeve 12 detachably connected to the mounting support 5.

An inner diameter of the camera sleeve 11 is less than an inner diameter of the fixed sleeve 12.

A sliding hole 111 penetrating through the camera sleeve 11 is formed in an extending direction of the camera sleeve 11.

The sliding hole 111 is communicated with an inner cavity of the fixed sleeve 12.

The sliding rod 64 is slidably connected to the camera sleeve 11 through the sliding hole 111.

Due to the arrangement of the camera sleeve 11, close-fitting mounting of a camera component 7 is facilitated. The camera component 7 is mounted at the camera sleeve 11 in the close-fitting manner, which contributes to reducing a phenomenon that dirt or a fluid enters the visual tweezers when the visual tweezers enter the ear canal, nasal cavity, throat, or another narrow space of a person deeply.

The inner diameter of the camera sleeve 11 is set to be less than the inner diameter of the fixed sleeve 12. On the one hand, this is for the arrangement of the sliding hole 111, so that the sliding rod 64 that slides in the sliding hole 111 is located at a periphery of the camera component 7 to ensure to the maximum extent that the first clamping arm 2 and the second clamping arm 3 which are driven and controlled by the sliding rod 64 are located in a capturing region of the camera component 7. Furthermore, to a certain extent, it is difficult for the sliding rod 64 to do motions besides pushing out and pulling back in the first shell 1, which reduces the phenomenon that the opening angle and closing clamping strength between the first clamping arm 2 and the second clamping arm 3 is affected by the motions of the sliding rod 64 besides pushing out and pulling back. On the other hand, the camera component 7 and the sliding rod 64 are arranged in different regions, which reduces the influence of the sliding rod 64 on the camera component 7 during driving and reduces the influence of the dirt or fluid brought in by the sliding of the sliding rod 64 on the camera component 7.

Specifically, two symmetric fixed lugs 112 are integrally formed at the end of the camera sleeve 11 away from the fixed sleeve 12. The fixed lugs 112 are located between the camera component 7 and the sliding hole 111. The first clamping arm 2 is rotatably connected to one of the fixed lugs 112, and the second clamping arm 3 is rotatably connected to the other fixed lug 112. As the first shell 1 is a component that enters the ear canal, nasal cavity, throat, or another narrow space of a person deeply, the end of the camera sleeve 11 connected to the first clamping arm 2 is gradually enlarged towards the end connected to the fixed sleeve 12, to achieve adaptive mounting on the mounting support 5.

Further, referring to FIG. 2, as a specific implementation of the visual tweezers provided in the present disclosure, the camera component 7 is mounted in the camera sleeve 11 in the close-fitting manner. The camera component 7 is located at the end of the camera sleeve 11 away from the fixed sleeve 12.

The first clamping arm 2 is rotatably connected to the end of the camera sleeve 11 away from the fixed sleeve 12.

The second clamping arm 3 is rotatably connected to the end of the camera sleeve 11 away from the fixed sleeve 12, and forms the clamping structure with the first clamping arm 2.

The clamping structure is located in a capturing region of the camera component 7.

An end portion of the camera component 7 away from a capturing end of the camera component is electrically connected with a communication line 8.

An extending direction of a section of the communication line 8 located in the fixed sleeve 12 is parallel to an extending direction of the sliding rod 64.

A reinforcing layer 81 is attached on the section of the communication line 8 located in the fixed sleeve 12.

The camera component 7 is configured to achieve image acquisition of the tweezers. The camera component 7 is arranged at the end of the camera sleeve 11 away from the fixed sleeve 12 to place the clamping structure formed by the first clamping arm 2 and the second clamping arm 3 in the capturing region of the camera component 7, so that a clamping action of the visual tweezers is within an image acquisition range, which facilitates operations of the tweezers entering the ear canal, nasal cavity, throat, or another narrow space of a person deeply.

The camera component 7 is electrically connected to a main board module 59 through the communication line 8 electrically connected to the camera component 7. The extending direction of the section of the communication line 8 located in the fixed sleeve 12 is set to be parallel to the extending direction of the sliding rod 64, so that the communication line 8 is difficultly twined around the sliding rod 64 located in the fixed sleeve 12, which reduces the phenomenon that the tweezers fail. The reinforcing layer 81 attached to the communication line 8 located in the fixed sleeve 12 improves the physical strength of this section of the communication line 8, which facilitates mounting and further makes it difficult to twine the communication line 8 around the sliding rod 64 located in the fixed sleeve 12.

Specifically, a limiting ring 113 is arranged at an end portion of the end of the camera sleeve 11 away from the fixed sleeve 12. The limiting ring 113 is coaxial with the camera sleeve 11 to prevent the camera component 7 mounted in the camera sleeve 11 in the close-fitting manner from being separated from the end of the camera sleeve 11 away from the fixed sleeve 12.

Specifically, the communication line 8 is a flexible line.

Figure 7:
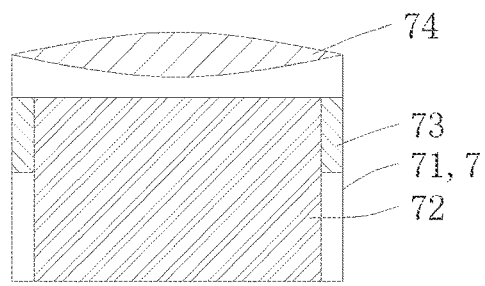
FIG. 7 is a schematic structural diagram of a camera component in visual tweezers according to an embodiment of the present disclosure.

Further, referring to FIG. 2 and FIG. 7 together, as a specific implementation of the visual tweezers provided in the present disclosure, the camera component 7 includes an external member 71 for mounting mounted in the camera sleeve 11 in the close-fitting manner, a camera 72 configured to acquire imaging information, a supplement light group 73 arranged on a wall of the camera 72 in a surrounding manner, and a wide-angle lens 74 located in a capturing direction of the camera 72.

The wide-angle lens 74 is hermetically connected to the external member 71 for mounting.

The supplement light group 73 is located in the external member 71 for mounting, and the supplement light group 73 sleeves an outer wall of the camera 72.

The camera 72 is located in the external member 71 for mounting.

The camera 72 is mounted at one end of the external member 71 for mounting close to the wide-angle lens 74 in an embedded manner.

The wide-angle lens 74 is hermetically mounted to the external member 71 for mounting to improve the sealing performance of the camera component 7, which effectively prevents water or foreign matters from enter the camera component 7 and also prolongs the service life of the camera component 7. Due to the supplement light group 73 arranged between the camera 72 and the external member 71 for mounting, when the clamping structure works in the ear canal, nasal cavity, throat, or another narrow space of a person, the supplement light group 73 enhances the light intensity, which improves the clarity of the camera component 7 during capturing. The supplement light group 73 is arranged at the periphery of the camera 72 in the surrounding manner, so that an irradiation direction of light emitted by the supplement light group 73 is consistent with the capturing direction of the camera 72 to a certain extent, which effectively improves the light intensity of a capturing environment of the camera 72.

The external member 71 for mounting is a tubular member.

In addition, in order to improve the image stabilization performance of the visual tweezers during operation, the image stabilization performance of the camera 72 can be improved, or the image stabilization performance of the visual tweezers is overall improved by setting an image stabilization algorithm inside.

The wide-angle lens 74 is a 105-degree wide-angle lens 74. The wide-angle lens 74 is a waterproof and fogproof lens. The wide-angle lens 74 is the waterproof and fogproof lens, so that a phenomenon of blurred images captured by the camera component 7 is reduced during operation of a dental scaler, and it is more favorable for a user to accurately control a dental cleaning process, thereby improving the safety in the dental cleaning process. The wide-angle lens 74 is the 105-degree wide-angle lens 74. A working region of the clamping structure is located in the capturing region of the camera component 7 formed by the capturing of the 105-degree wide-angle lens 74.

The wide-angle lens 74 is set to be the 105-degree wide-angle lens 74, so that the capturing range of the camera component 7 is effectively expanded, and the clarity of the working region of the clamping structure captured by the camera component 7 is improved. It is favorable for the user to accurately control a process of clamping an object with the visual tweezers, thereby improving the safety in the process of clamping an object.

The 105-degree wide-angle waterproof and fogproof lens has a depth of focus of 8 to 60 mm, which facilitates observing conditions in the ear canal, nasal cavity, throat, or another narrow space of a person more clearly at a long distance.

The supplement light group 73 adopts an ultraviolet lamp, which can support lighting of the visual tweezers and also achieve a disinfection function to a certain extent.

Further, referring to FIG. 2, as a specific implementation of the visual tweezers provided in the present disclosure, an accommodating slot 52 is formed in one end of the mounting support 5 away from the drive component 6.

A battery module 53 located in the accommodating slot 52, a main board module 59 electrically connected to the battery module 53, an image processing module 54 electrically connected to the main board module 59, and a charging module 55 electrically connected to the main board module 59 are mounted on the mounting support 5.

An end portion of the main board module 59 is fixedly connected to the mounting support 5.

One end of the communication line 8 away from the camera component 7 is connected to the main board module 59.

The charging module 55 is mounted at the end of the mounting support 5 away from the drive component 6.

The charging module 55 includes an iron ring 551, a first copper negative member 552, and a first positive thimble 553.

The iron ring 551 is mounted at the end of the mounting support 5 away from the drive component 6. The first copper negative member 552 sleeves the iron ring 551 and is electrically connected to the main board module 59. The first positive thimble 553 is electrically connected to the main board module 59 by passing through the first copper negative member 552, the iron ring 551, and an end portion of the mounting support 5 in sequence.

The accommodating slot 52 is arranged to hide and mount the battery module on the mounting support 5, which reduces an occupied space of the battery module 53. The battery module 53, the image processing module 54, the charging module 55, and the communication line 8 are integrated on the main board module 59, which improves the circuit integration degree of the visual tweezers. The main board module 59 is fixedly mounted on the mounting support 5 in the form of a fixed end portion, so as to fix the position of the main board module 59 on the mounting support 5. The charging module 55 is mounted at the end of the mounting support 5 away from the drive component 6, so as to set a charging way for the visual tweezers. Both wireless charging and wired charging are convenient and reduce damage to the appearance of the visual tweezers to a great extent. Due to the arrangement of the first copper negative member 552 and the first positive thimble 553, it is convenient to plug the visual tweezers on a base for wireless charging. The iron ring 551 is arranged to cooperate with a magnetic part 91 arranged on the base, so that the visual tweezers can be attracted and fixed at its position.

Specifically, two ends of the main board module 59 are mounted at a notch of the accommodating slot 52 through screws. A first round countersink 56 is formed in the end of the mounting support 5 away from the drive component 6, and a first cylinder 57 is arranged on an axial line of the first round countersink 56. A first annular slot 58 is formed in a bottom of the first round countersink 56. The first annular slot 58 and the first round countersink 56 are coaxially arranged. The iron ring sleeves and is fixed on the first cylinder 57. The first copper negative member 552 is plugged in the first annular slot 58 and is electrically connected to the main board module 59. The first copper negative member 552 is in no contact with the iron ring 551. The first positive thimble 553 is arranged on the first cylinder 57 in a penetrating manner and is electrically connected to the main board module 59. The first positive thimble 553 is in no contact with the iron ring 551. The image processing module 54 is located on one side of the main board module 59 away from the battery module 53.

Further, referring to FIG. 2, as a specific implementation of the visual tweezers provided in the present disclosure, the first shell 1 is sleeved with a cover body 9. The magnetic part 91 is attached on the cover body 9.

The section of the communication line 8 located in the fixed sleeve 12 is electrically connected to a hall magnetic switch 82 used for sensing the magnetic part 91.

When the hall magnetic switch 82 is separated from the magnetic part 91, the visual tweezers are initiated.

The first shell 1 is sleeved with the cover body 9, and the magnetic part 91 is attached on the cover body 9.

The section of the communication line 8 located in the fixed sleeve 12 is electrically connected to the hall magnetic switch 82 used for sensing the magnetic part 91.

When the cover body 9 is covered at the first shell 1, the hall magnetic switch 82 senses the magnetic part 91, and the main board module 59 cuts off a power supplying circuit of the battery module 53.

When the cover body 9 is separated from the first shell 1, magnetic sensing between the hall magnetic switch 82 and the magnetic part 91 is cut off, and the main board module 59 initiates the power supplying circuit of the battery module 53.

The cover body 9 is covered at the first shell 1, so that a clamping component and the camera component 7 are both located in the cover body 9, which effectively reduces a phenomenon that the clamping component is infected by germs and reduces a phenomenon that other external objects damage the clamping component and the camera of the camera component 7. As the magnetic part 91 is arranged on the cover body 9, and the hall magnetic switch 82 is arranged on the cover body 9 to sense the magnetic part 91, the purpose of initializing the visual tweezers once the cover body 9 is opened, which improves the user experience.

Specifically, a second shell 100 spliced with the first shell 1 sleeves the mounting support 5. A third shell 200 spliced with the second shell 100 sleeves the cover body 9. Due to the arrangement of the second shell 100, the mounting support 5 and other components arranged on the mounting support 5 are protected in the second shell 100. Due to the arrangement of the third shell 200, the cover body 9 and other components arranged on the cover body 9 are protected in the third shell 200. Furthermore, the second shell 100 and the third shell 200 make the visual tweezers look attractive. Textures are formed on an outer wall of the second shell 100.

Further, referring to FIG. 5 and FIG. 6 together, as a specific implementation of the visual tweezers provided in the present disclosure, the visual tweezers further include a rubber sleeve 300 sleeving the clamping structure. The rubber sleeve 300 is provided with an inwards sunken groove 301.

The visual tweezers further include the rubber sleeve 300 sleeving the clamping structure, and the rubber sleeve 300 is provided with an arc-shaped groove to simulate a shape of an ear pick. The rubber sleeve 300 may be made of a silica gel material which has good chemical stability. Due to the inwards sunken groove 301 formed in the rubber sleeve 300, the rubber sleeve 300 also has a function of the ear pick. That is, when the rubber sleeve 300 is removed, the visual tweezers according to this embodiment of the present disclosure can be used as tweezers. When the rubber sleeve 300 sleeves the clamping structure, the visual tweezers can be used as the ear pick. The tweezers function and the ear pick function can be randomly switched conveniently.

Figure 8:
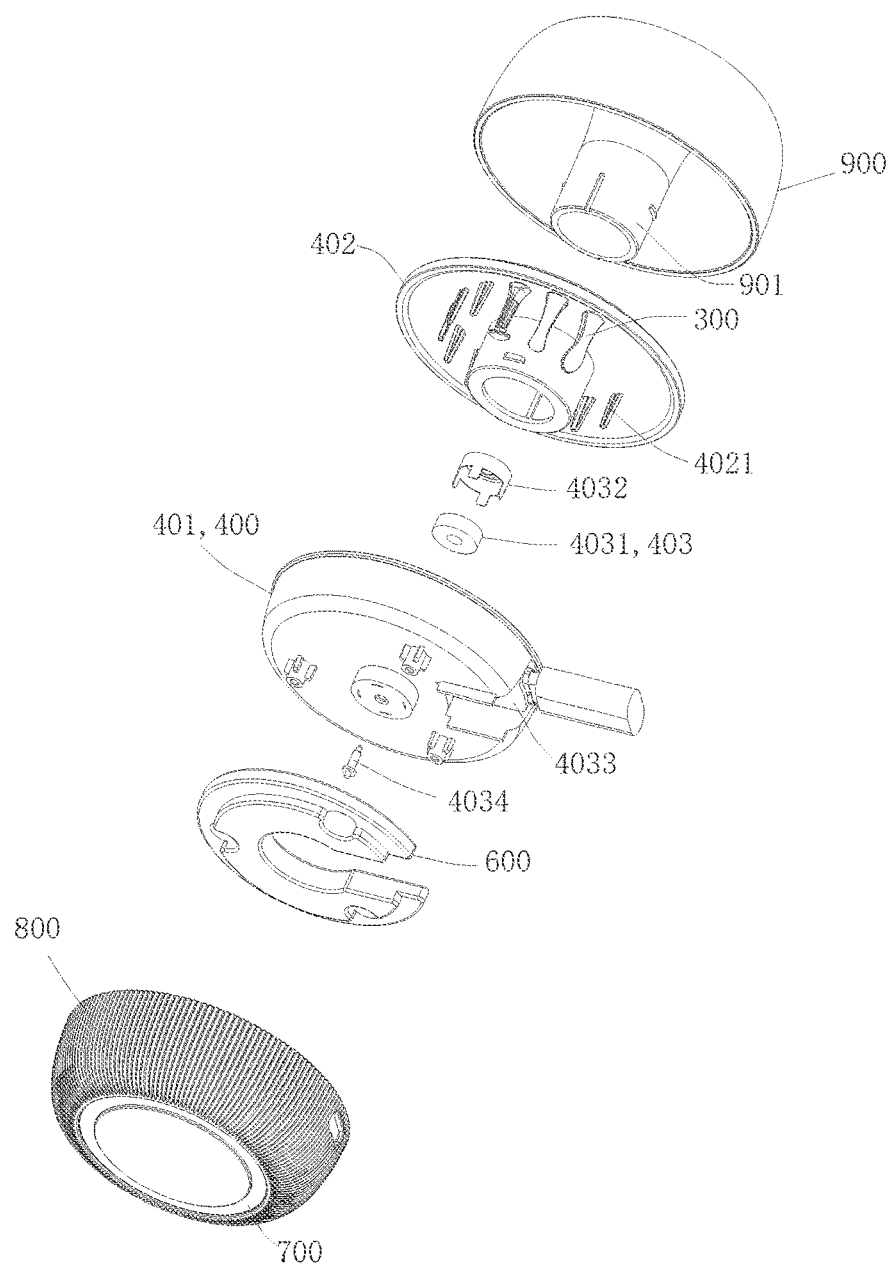
FIG. 8 is a first schematic structural diagram of a base component in visual tweezers according to an embodiment of the present disclosure.
Figure 9:
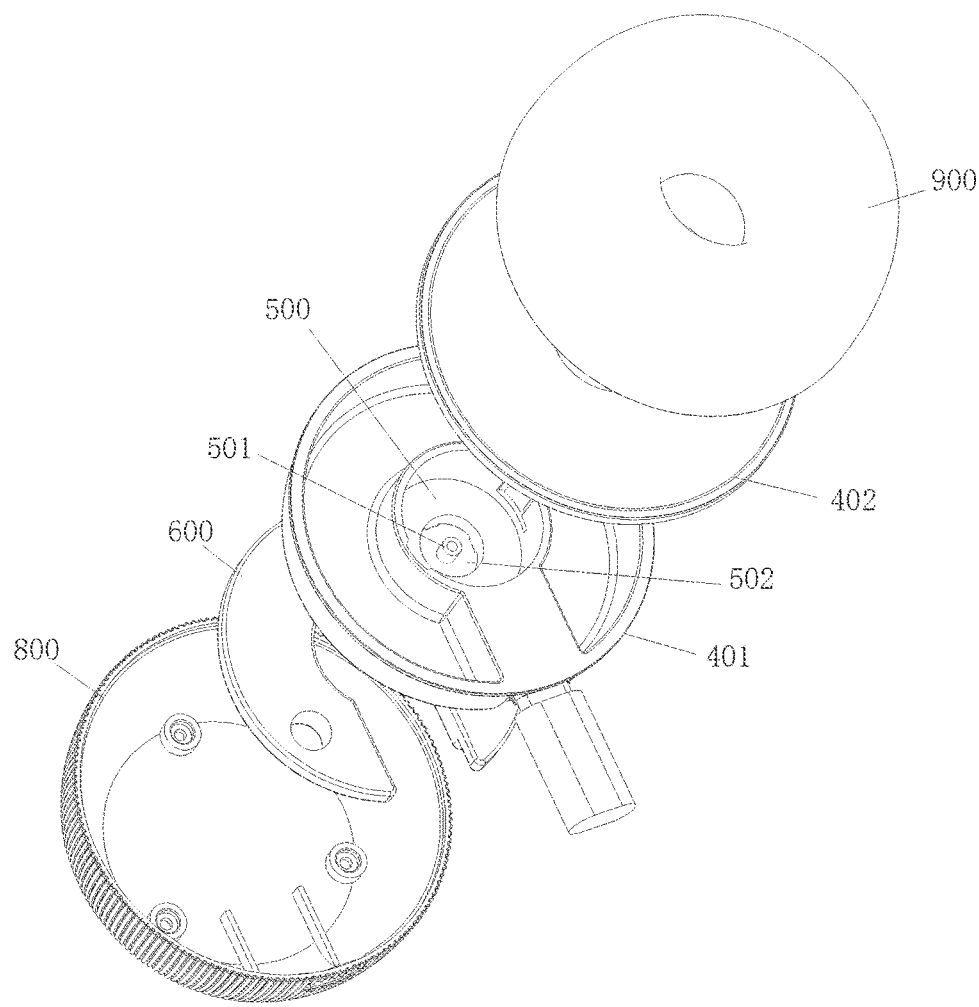
FIG. 9 is a second schematic structural diagram of a base component in visual tweezers according to an embodiment of the present disclosure.

Further, referring to FIG. 8 and FIG. 9 together, as a specific implementation of the visual tweezers provided in the present disclosure, the visual tweezers further include a base component 400.

The base component 400 includes a first base member 401, a first ring 402 covered at the first base member 401, and a power supplying module 403 mounted on the first base member 401.

The power supplying module 403 includes an annular magnet 4031 mounted on the first base member 401, a second copper negative member 4032 sleeving the annular magnet 4031, a second positive thimble 4034 arranged on the first base member 401 in a penetrating manner, and a power supplying board 4033 mounted on the first base member 401.

When the visual tweezers are plugged into the base component 400, the annular magnet 4031 attracts the iron ring 551. The first positive thimble 553 resists against the second positive thimble 4034, and the first copper negative member 552 resists against the second copper negative member 4032.

Due to the arrangement of the second positive thimble 4034 and the second copper negative member 4032, an external power supply performs, through the power supplying board 4033, contact charging on the visual tweezers that is in contact with the second positive thimble 4034 and the second copper negative member 4032.

Specifically, the first base member 401, the first ring 402, the annular magnet 4031, the second copper negative member 4032, and the second positive thimble 4034 are coaxially arranged. A second round countersink 500 is formed in the first base member 401. A second cylinder 501 coaxial with the first base member 401 is arranged on one side of the first base member 401 close to the first ring 402. The annular magnet 4031 sleeves and is fixed on the second cylinder 501. A second annular slot 502 is formed in a bottom of the second round countersink 500. The second annular slot 502 and the second round countersink 500 are coaxially arranged. The second copper negative member 4032 is plugged in the second annular slot 502 and is electrically connected to the power supplying board 4033. The second positive thimble 4034 is arranged on the second cylinder 501 in a penetrating manner and is electrically connected to the power supplying board 4033.

Further, referring to FIG. 8, as a specific implementation of the visual tweezers provided in the present disclosure, a plurality of fixed posts 4021 are annularly arranged on one side of the first ring 402 facing the first base member 401. The rubber sleeve 300 sleeves the fixed posts 4021.

Due to the plurality of fixed posts 4021, the unused rubber sleeve 300 is fixed on the fixed posts 4021 to reduce a phenomenon that the rubber sleeve 300 is infected by germs or damaged by external factors.

Specifically, a balancing weight 600 is mounted on one side of the first base member 401 away from a first covering member, which increases the weight of the base component 400, so that the base component 400 is hard to move during removal and plugging of the visual tweezers.

A second base member 800 is mounted on one side of the first base member 401 close to the balancing weight 600. The balancing weight 600 is located in a cavity formed after the second base member 800 and the first base member 401 are mounted. A port for plugging the external power supply is formed in the second base member 800. An antiskid member 700 abuts against one side of the second base member 800 away from the first base member 401, which effectively reduces the phenomenon that the base component 400 moves during the removal and plugging of the visual tweezers.

A second ring 900 is mounted on one side of the first ring 402 away from the first base member 401. A mounting barrel 901 is integrally formed on an inner circle of the second ring 900. The mounting barrel 901 is plugged on the first base member 401, and the power supplying module 403 is located in the mounting barrel 901. The first ring 402 sleeves the mounting barrel, so that when the visual tweezers are plugged into the base component 400, the visual tweezers can be directly plugged into the base component 400 along the mounting barrel for charging.

Figure 10:
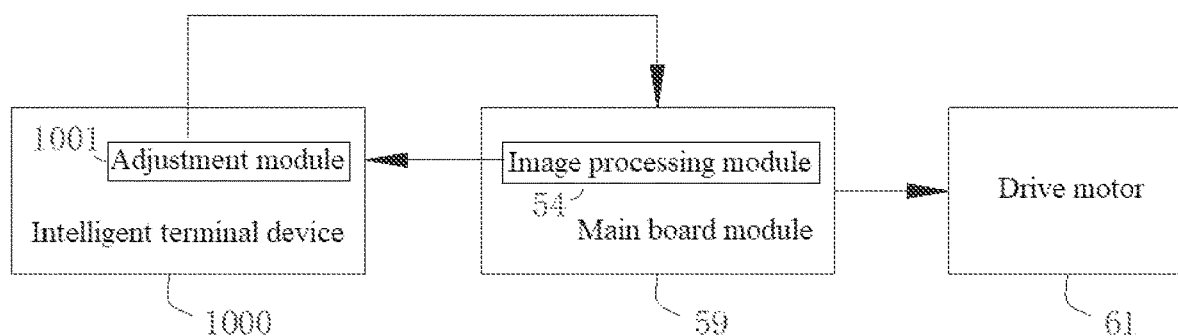
FIG. 10 is a schematic structural diagram of a tweezers assembly according to an embodiment of the present disclosure.

Referring to FIG. 10, a tweezers assembly provided in the present disclosure is now described. The tweezers assembly includes:

visual tweezers, and an intelligent terminal device 1000 in communication connection with the main board module 59. The main board module 59 is provided with the image processing module 54 configured to form an image signal according to an image captured by the camera component 7 and send the image signal to the intelligent terminal device 1000. The intelligent terminal device 1000 is provided with an adjustment module 1001. The adjustment module 1001 is configured to send, according to the image signal received by the intelligent terminal device 1000, an adjustment instruction for adjusting opening and closing angles between the first clamping arm 2 and the second clamping arm 3 to the main board module 59. The main board module 59 controls a rotating direction and rotating speed of the drive motor 61 according to the adjustment instruction to control opening and closing angles of the visual tweezers.

Compared with the prior art, the tweezers assembly provided in the present disclosure has the advantages below: As the intelligent terminal device 1000 in communication connection with the main board module 59 is arranged, and the image processing module 54 is arranged on the main board module 59, the image processing module 54 can send the image captured by the camera component 7 to the intelligent terminal device 1000. Furthermore, the intelligent terminal device 1000 is provided with the adjustment module 1001. The adjustment module 1001 can send, according to the received image signal, the adjustment instruction for adjusting the opening and closing angles between the first clamping arm 2 and the second clamping arm 3 to the main board module 59, so that the intelligent terminal device 1000 can control the opening and closing angles of the visual tweezers in real time and conveniently, and the visual tweezers can still be precisely intelligently controlled and operated even in dark and narrow places, thereby fully meeting needs of an operator.

Specifically, the intelligent terminal device 1000 may be a mobile phone, a tablet, a computer, and the like.

The foregoing description is merely illustrative of the preferred embodiments of the present disclosure and is not intended to limit the present disclosure, but it is intended that any modifications, equivalents, substitutions, and modifications made within the spirit and principles of the present disclosure be embraced within the scope of the present disclosure.

What is claimed is:

1. Visual tweezers, comprising:
    a first shell, a first clamping arm rotatably connected to an end portion of the first shell, a second clamping arm rotatably connected to the end portion of the first shell and forming a clamping structure with the first clamping arm, and a push block slidably connected to the first clamping arm and the second clamping arm and configured to control opening and closing angles of the first clamping arm and the second clamping arm during sliding,
    wherein a first sliding slot is formed in the first clamping arm;
    a second sliding slot is formed in the second clamping arm;

an angle between an extending direction of the first sliding slot and an extending direction of the second sliding slot is an acute angle; and a first sliding member in sliding fit with the first sliding slot, and a second sliding member in sliding fit with the second sliding slot are arranged on the push block;

Wherein one end of the first shell away from the first clamping arm is detachably connected with a mounting support;

a drive component is mounted at one end of the mounting support close to the first shell;

the drive component comprises a drive motor, a rotating shaft, a shaft sleeve, and a sliding rod;

a drive shaft of the drive motor is in key connection with the rotating shaft;

a screw rod is arranged at one end of the rotating shaft away from the drive shaft, and the screw rod and the drive shaft are coaxially arranged; and the shaft sleeve is screwed with the rotating shaft through the screw rod;

Wherein a limiting slot used for limiting rotation of the shaft sleeve is formed in the end of the mounting support close to the first shell;

one end of the shaft sleeve is located in the limiting slot, and the shaft sleeve is in sliding connection with the mounting support through the limiting slot;

the sliding rod is connected to the shaft sleeve; and one end of the sliding rod away from the shaft sleeve is fixedly connected with the push block.

2. The visual tweezers according to claim 1, wherein the first shell comprises a camera sleeve and a fixed sleeve configured to be detachably connected to the mounting support and integrated with the camera sleeve;

an inner diameter of the camera sleeve is less than an inner diameter of the fixed sleeve;

a sliding hole penetrating through the camera sleeve and allowing the sliding rod to slide is formed in an extending direction of the camera sleeve; and the sliding hole is communicated with an inner cavity of the fixed sleeve.

3. The visual tweezers according to claim 2, wherein a camera component is mounted in a close-fitting manner at one end of the camera sleeve away from the fixed sleeve;

the first clamping arm is rotatably connected to the end of the camera sleeve away from the fixed sleeve;

the second clamping arm is rotatably connected to the end of the camera sleeve away from the fixed sleeve, and forms the clamping structure with the first clamping arm;

the clamping structure is located in a capturing region of the camera component;

an end portion of the camera component away from a capturing end of the camera component is electrically connected with a communication line; and an extending direction of a section of the communication line located in the fixed sleeve is parallel to an extending direction of the sliding rod.

4. The visual tweezers according to claim 3, wherein an accommodating slot is formed in one end of the mounting support away from the drive component;

a battery module located in the accommodating slot, a main board module electrically connected to the battery module, an image processing module electrically connected to the main board module, and a charging module electrically connected to the main board module are mounted on the mounting support;

an end portion of the main board module is fixedly connected to the mounting support;

one end of the communication line away from the camera component is connected to the main board module;

the charging module is mounted at the end of the mounting support away from the drive component;

the charging module comprises an iron ring, a first copper negative member, and a first positive thimble;

the iron ring is mounted at the end of the mounting support away from the drive component; the first copper negative member sleeves the iron ring and is electrically connected to the main board module; and the first positive thimble is electrically connected to the main board module by passing through the first copper negative member, the iron ring, and an end portion of the mounting support in sequence.

5. The visual tweezers according to claim 4, wherein the first shell is sleeved with a cover body; a magnetic part is attached on the cover body;

one end of the communication line located in the fixed sleeve is electrically connected to a hall magnetic switch used for sensing the magnetic part;

when the cover body is covered at the first shell, the hall magnetic switch senses the magnetic part, and the main board module cuts off a power supplying circuit of the battery module; and when the cover body is separated from the first shell, magnetic sensing between the hall magnetic switch and the magnetic part is cut off, and the main board module initiates the power supplying circuit of the battery module.

6. The visual tweezers according to claim 4, further comprising a rubber sleeve sleeving the clamping structure, wherein the rubber sleeve is provided with an inwards sunken groove.

7. The visual tweezers according to claim 4, further comprising a base component, wherein the base component comprises a first base member, a first ring covered at the first base member, and a power supplying module mounted on the first base member;

the power supplying module comprises an annular magnet mounted on the first base member, a second copper negative member sleeving the annular magnet, a second positive thimble arranged on the first base member in a penetrating manner, and a power supplying board mounted on the first base member;

when the charging module is plugged into the base component, the annular magnet attracts the iron ring for fixing; the first positive thimble resists against the second positive thimble; and the first copper negative member resists against the second copper negative member.

8. A tweezers assembly, comprising the visual tweezers according to claim 4, and further comprising an intelligent terminal device in communication connection with the main board module, wherein the main board module is provided with the image processing module configured to form an image signal according to an image captured by the camera component and send the image signal to the intelligent terminal device; the intelligent terminal device is provided with an adjustment module; the adjustment module is configured to send, according to the image signal received by the intelligent terminal device, an adjustment instruction for adjusting opening and closing angles between the first clamping arm and the second clamping arm to the main board module; and the main board module controls a rotating direction and rotating speed of the drive motor according to the adjustment instruction to control opening and closing angles of the visual tweezers.

* * * * *